United States Patent [19]

Rose et al.

[11] Patent Number: 4,922,450

[45] Date of Patent: May 1, 1990

[54] COMMUNICATIONS MANAGEMENT SYSTEM HAVING MULTIPLE POWER CONTROL MODES

[76] Inventors: Frederick A. Rose, Rte. 3, Box 529; Christopher P. DeWitt, Rte. 3, Koshkonong Lake Rd., both of Fort Atkinson, Wis. 53538

[21] Appl. No.: 106,184

[22] Filed: Oct. 8, 1987

[51] Int. Cl.$^5$ .................................................. G06F 1/00
[52] U.S. Cl. .................................. 364/900; 364/948.4; 364/921.9
[58] Field of Search ... 364/200 MS File, 900 MS File; 379/93, 98, 94, 102, 104, 105

[56] References Cited

U.S. PATENT DOCUMENTS

| | | | |
|---|---|---|---|
| 4,051,326 | 9/1977 | Badagnani et al. | 364/900 X |
| 4,124,773 | 11/1978 | Elkins | 179/2 A |
| 4,203,153 | 5/1980 | Boyd | 364/200 |
| 4,335,426 | 6/1982 | Maxwell et al. | 364/200 |
| 4,371,752 | 2/1983 | Matthews et al. | 179/7.1 TP |
| 4,484,028 | 11/1984 | Kelley et al. | 379/94 |
| 4,701,946 | 10/1987 | Oliva et al. | 379/102 X |
| 4,723,269 | 2/1988 | Summerlin | 379/102 |

*Primary Examiner*—Thomas M. Heckler
*Attorney, Agent, or Firm*—Lockwood, Alex, FitzGibbon & Cummings

[57] ABSTRACT

A communications management system for use in conjunction with a host computer includes independently powered processing circuitry which automatically powers up the host computer upon receipt of an incoming message or initiation of an outgoing message, thereby avoiding the need for the computer to be continuously powered. The computer is also powered-up by user-actuation of a panel switch, or by an internal timer which establishes a predetermined powered-up monitoring period. A mode selection circuit prevents conflicts between the various power control factors when powering down the computer.

3 Claims, 5 Drawing Sheets

COMMUNICATIONS MANAGEMENT SYSTEM HAVING MULTIPLE POWER CONTROL MODES

BACKGROUND OF THE INVENTION

The present invention is generally related to information processing systems, and more specifically to a communications management system for use in conjunction with a personal computer.

Personal computers have proven useful for assisting a user in managing communications over one or more telephone lines. To be of maximum benefit such communications management systems should preferably include the capability of automatically placing and receiving telephone calls, in either voice or digital form, and the capability of receiving, storing, transmitting and relaying messages to and from designated parties, as well as other ancillary functions, such as the maintenance of an activity log or an appointment calendar on which the receipt of such messages or expectation of future responses can be noted.

One drawback of prior systems intended to provide such features has been the necessity of keeping the host computer powered up at all times during which the possibility of incoming calls exists so that necessary signal processing and decision making with respect to such messages can be accomplished by the hardware and software of the computer. This reduces the service life of the host computer, and undesirably increases power consumption.

One system which avoids this problem is shown in the copending application of Fred A. Rose, Ser. No. 943,565, Filed Dec. 18, 1986, entitled "Communication Management System". Basically, this system provides a microprocessor-based control and processing system which is independently powered and capable of controlling the application of power to the host computer. The system is provided on a single plug-in circuit board adapted to be received in an existing and conventional expansion port of the host computer, and includes all necessary circuitry for analyzing an incoming message, verifying the messsage and taking appropriate action, including powering up the computer. No modification whatsoever of the computer is required.

The communications management system of the present invention provides, as an improvement to this system, computer power-up and power down in response to: (1) user-initiated commands, or (2) a built in timer which defines a predetermined monitoring period, or (3) the operating system in the event of an outgoing message or the need to download software; and for the provision of mode control means for preventing conflicts between these access requirements upon power-down of the computer.

Accordingly, it is a general object of the present invention to provide a new and improved communications management system for a personal computer or other small computer system.

It is a more specific object of the present invention to provide a new and improved communications processing system for a personal computer wherein the system is continuously operative for its intended purpose and the host computer is powered-up only when required, either by internal requirements such as message origination, software downloading or a predetermined monitoring period, or by external requirements such as a user request for access.

SUMMARY OF THE INVENTION

The invention is directed to a communications management system for use in conjunction with an externallypowered host computer for responding to communication signals on a communications line. The system includes a power source independent of the host computer, and power control means responsive to applied control signals for applying operating power to the host computer. First control circuit means responsive to the communications signal on the communications line and operable from the independent power source are provided for applying a first control signal to the power control means upon receipt of the communications signal to power up the computer during a processing period. Second control circuit means including timer means defining a predetermined monitoring period provide a second control signal for application to the power control means to render the computer operative during the monitoring period.

The invention is further directed to a communications management system as described above which includes mode control means responsive to the control signals for preventing the first control signal from powering-down the computer during the monitoring period, and the second control signal from powering-down the computer during the processing period.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figures 1, 2:
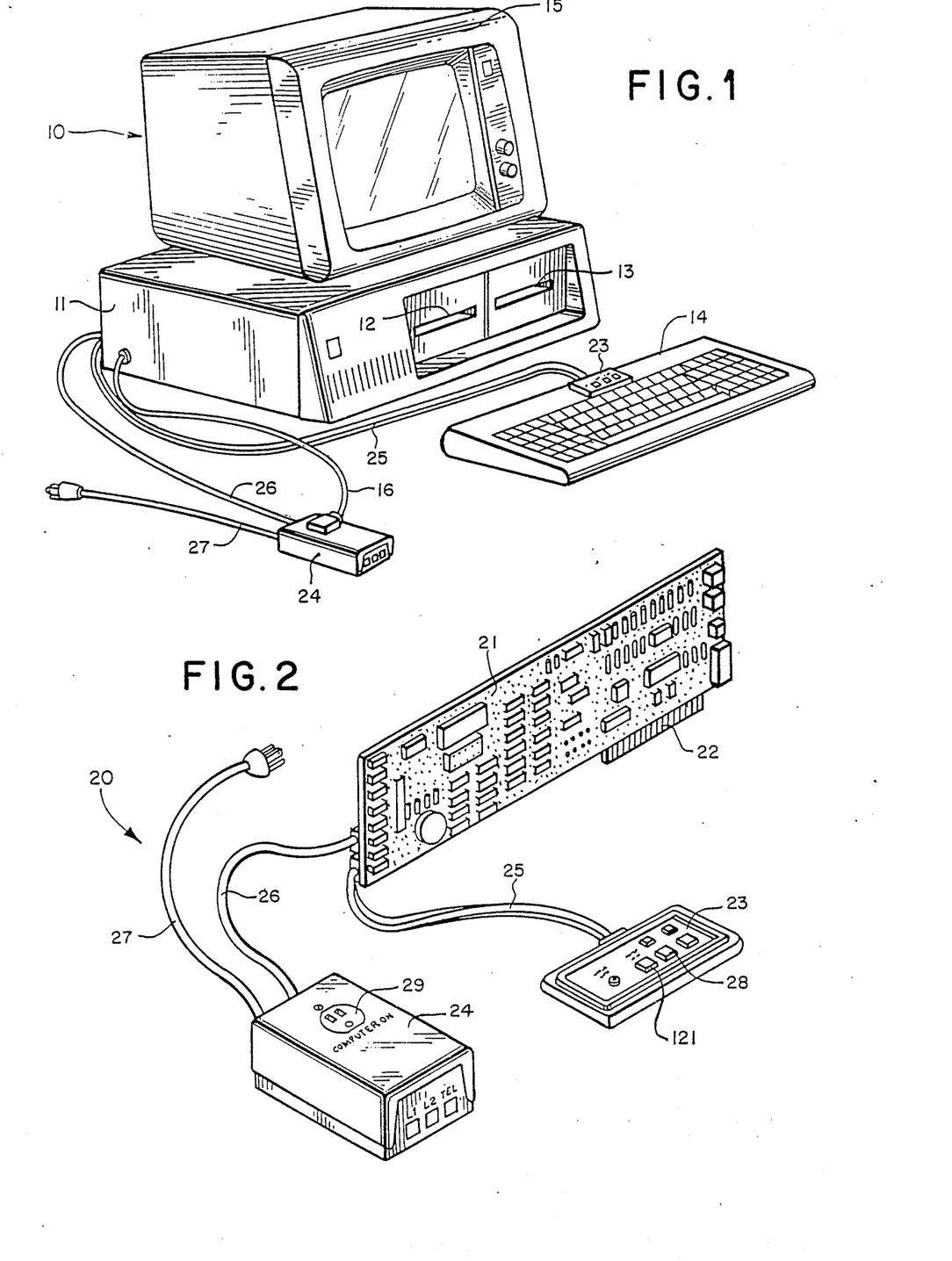
FIG. 1 is a perspective view of a personal computer having a communications management system constructed in accordance with the invention installed therein.
FIG. 2 is a perspective view of the communications management system showing the principal components of the system.

Referring to the Figures, and particularly to FIG. 1, a personal computer 10 of a type suitable for use as host computer to the communications management system of the present invention is seen to include generally a main processing unit 11, a pair of disc drives 12 and 13, a keyboard 14 and a monitor 15. The five components of computer 10 may be conventional in design and construction and may be conveniently mounted as shown, alternating line current being provided to the units by means of single power cord 16 extending from the main computing unit 11.

Referring to FIG. 2, a communications management system 20 constructed in accordance with the invention for use with personal computer 10 is seen to include a circuit board 21 adapted to fit within an expansion slot (not shown) within the computer. To this end, the circuit board 21 includes a connector 22 which mates with the connector provided in the expansion slot in a manner well known to the art. The communications management system 20 further includes a local keyboard 23 and a power control and telephone line interface module 24. Keyboard 23 is connected to circuit board 21 by a cable 25 and module 24 is connected to circuit board 21 by a cable 26. A conventional electrical power cord 27 is provided to supply alternating current to module 24.

The top surface of actuator panel 23 includes a push button type actuator switch 28 for a designated auxiliary function of the communications management system. Various other switches for various other functions, as well as various indicator lights, can be provided on the subpanel as required by a particular application in which the communications management system is utilized.

When the communications management system 20 is installed in personal computer 10 the power cord 16 of the computer is inserted in a receptacle 29 provided on module 24. As will be seen presently, it is the function of module 24 to control the application of power to computer 10, and the insertion of power cord 16 into the module facilitates such control without modification to the computer.

Figure 3:
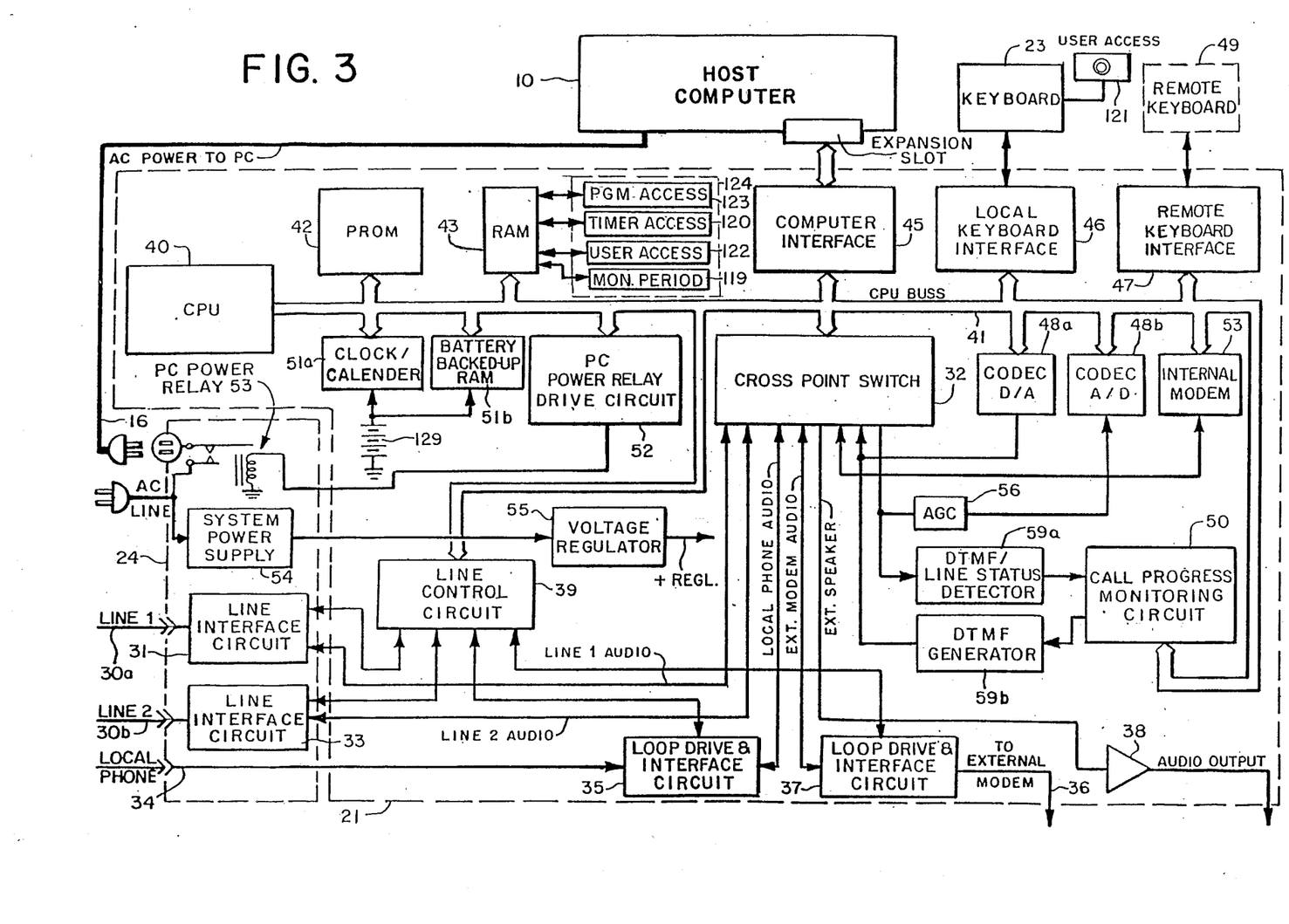
FIG. 3 is a simplified functional block diagram of the communications management system of the invention.

Referring to FIG. 3, the communications management system 20 is seen configured for operation with two telephone lines 30a and 30b. However, it will be appreciated that a lesser or greater number of lines can be accommodated with appropriate modifications to the circuitry of the system. Line 30a is connected to interface circuit 31, which detects off-hook and ring conditions and provides proper isolation for the telephone lines. The output of interface circuit 31, comprising the audio signal present on line 1, is applied to a cross point switch device 32 on circuit board 21. Similarly, line 2 is applied to a line interface circuit 33 located within module 24, which is connected to another input of cross point switch 32. A local telephone connected to a line 34 is similarly connected through a loop drive and interface circuit 35 to cross point switch 32. An external modem (not shown) may be similarly connected by a line 36 and loop drive and circuit 37 to cross point switch 32. External audio may be provided by cross point switch 32 through an amplifier 38 to an external speaker (not shown) or other listening device.

Interface circuits 31 and 33 provide for detection of off-hook and ring conditions in addition to providing an isolated audio signal to cross point switch 32. Interface circuits 35 and 37 provide necessary loop drive current for their associated telephone apparatus in addition to detecting off-hook and ring conditions. The operating status (off-hook or on-hook) of the interface circuits is controlled by a line control circuit 39 which provides appropriate status control signals to the interface circuits. In addition, the condition of the lines associated with each interface circuit, as detected by that interface circuit, is signaled to line control circuit 39. As will be seen presently, this circuit is in communication with the microprocessor-based logic decision and control elements of communications management system 20 so that the appropriate communication status is maintained with each of the external communications lines.

Cross point switch 32 and line control circuit 39 are connected by a conventional data control and address bus (CPU bus) 41 to a central processing unit (CPU) 40, which may be conventional in design and construction. For example, in the particular application herein described a Hitachi type 64180 CPU has been utilized. In a conventional manner, the CPU address bus 41 is connected to a PROM 42, a RAM 43, a computer interface circuit 45, a local keyboard interface circuit 46, a remote keyboard interface circuit 47, a CODEC digital-to-analog converter circuit 48a, a CODEC analog-to-digital circuit 48b, a call progress monitoring circuit 50, a calendar and clock circuit 51a and associated RAM 51b, and a PC power relay drive circuit 52. The output of the power relay drive circuit 52 is connected to a power control relay 53 within module 24 through cable 26 (FIG. 1). Relay 53 may be either a conventional electromechanical component as shown, or a solid state equivalent, such as a triac.

When relay 53 is actuated by drive circuit 52, the host computer 10 is connected to and powered by the AC line through module 24. Module 24 also contains a power supply circuit 54 for supplying operating power through a voltage regulator 55 on circuit board 21 to the various components and circuits of the communications management system 20. The remote keyboard interface 47 is intended for use with an additional optional remote keyboard 49.

To provide for recognition and control of the progress of a particular telephone communication, cross point switch 32 causes a selected one or more of input lines 30, 31 or 36 to be connected to a dual tone multi frequency (DTMF) detector 59a and a dual tone multi frequency (DTMF) generator 59b. The two DTMF modules are in turn connected to call progress monitoring circuit 50, which coordinates the detection and generation of signaling tones on the telephone lines during operation of the system. In use, progress monitoring circuit 50 provides signals on bus 41 indicative of the occurrence of various DTMF touch tone user-initiated code signals on the telephone lines, and controls the operation of generator 59b in providing such tones on the telephone lines to signal other users when required. Call progress monitoring circuit 50 also provides signals on bus 41 indicative of the telephone company "call progress" signals, such as dialtone signal, ring signal, busy signal, etc.

The selected input from cross point switch 32 is also applied through an AGC circuit 56 to CODEC analog-to-digital converter 48b, which converts voice transmissions on telephone lines 30a and 30b to serial digital form for conveyance by bus 41 to appropriate storage locations. The CODEC digital-to-analog converter 48a provides for conversion of serially occurring digital data on bus 41 to an analog form for transmission to cross point switch 32. The CODEC in this particular applicaiton is a Texas Instrument type TMS2916. In practice, a single CODEC module may be provided to perform both the digitization and reconstruction of the waveform.

Figure 4:
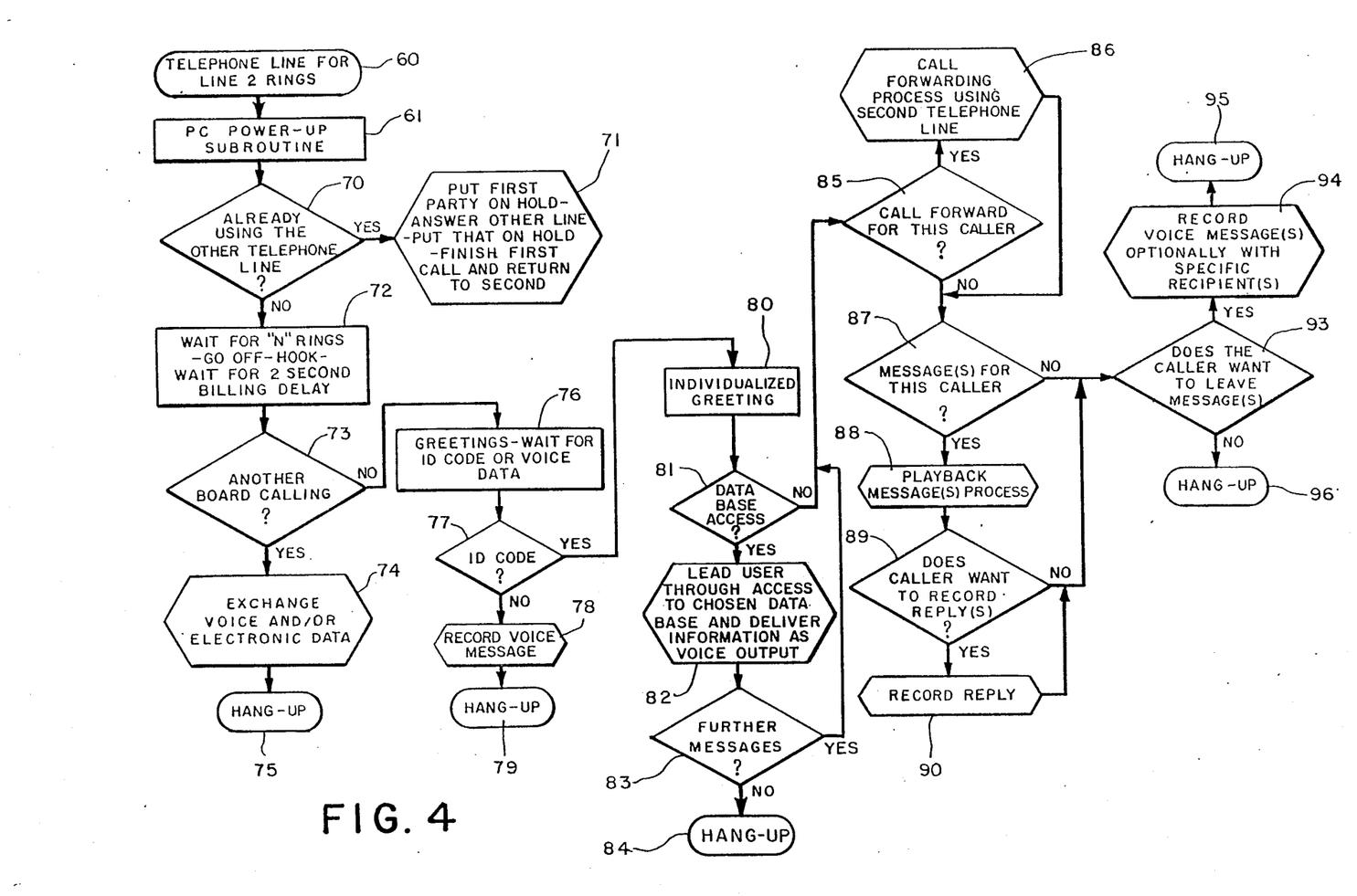
FIG. 4 is a simplified flow chart showing the principal decision processes involved in the functioning of the communications management system of the invention.
Figure 5:
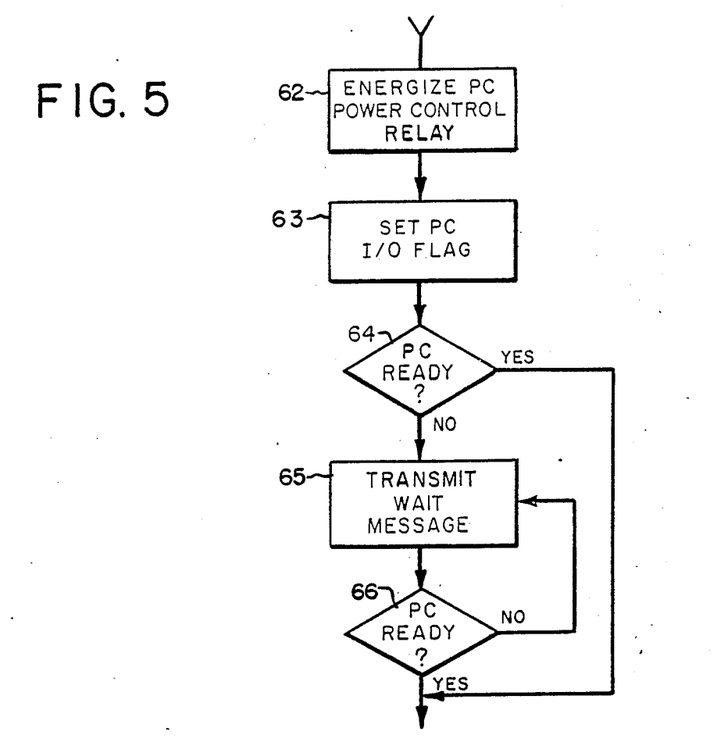
FIG. 5 is a simplified flow chart showing the principal decision processes involved in the host computer being powered up by the communications management system.

Referring to FIG. 4, in operation the ringing of either line 1 or line 2 at step 60 causes communications management system 20 to perform a PC power up subroutine at step 61. In this routine, as shown in FIG. 5, the PC power control relay 53 is energized at step 62 to apply line voltage to the host computer 10 if the computer is not already on. When used in this application, the host computer is connected to the controlled outlet 29 on module 24 and the normal ON/OFF power switch on the computer is left in the ON position, thereby allowing the communication management system to control powering on of the computer without the need for modifications to the computer. As the host computer powers up, which may take as long as 45 seconds depending on the particular architecture of the computer, processor 40 causes, at step 63, an input/output (I/O) flag to be set at computer interface 45. This signals the host computer that the management system 20 resident on board 21 requires use of the host computer. Once the I/O flag has been set processor 40 inquires at step 64 through interface 45 whether the host computer is operative. In the event that the host computer is not operative, a wait message is transmitted on the incoming line at step 65. This message is digitally recorded in RAM 43. If required by the application, the CPU 40 can initiate the sending of an appropriate message stored in RAM 43 over either telephone line by making the appropriate connections between RAM 43, CODEC 48a and either line interface circuit 31 or 32. When the host computer is finally operational, as signaled through computer interface 45 to processor 40, the system proceeds through step 66 and returns to the main processing routine shown in FIG. 4.

Upon returning to the main routine, should the communications management system 20 be already using the other telephone line, as determined at step 70, a subroutine is entered at step 71, in which the first party is put on hold by appropriate directions from processor 40 to line control circuit 39 and interface circuits 31 and 33, and the other line is answered as previously described. After an appropriate greeting, the second line is put on hold and processing activity is returned to the first line, which is then processed before returning to the second line. This is in accordance with a subroutine at step 71 for which appropriate software has been stored either in RAM 43, or on a conventional disc or other storage medium (not shown) in host computer 10.

After determining at step 70 whether a second phone line is in use, the system waits at step 72 for a specified number of rings prior to going off-hook. Each ring on the active line is recognized by the call progress monitoring circuit 50, and conveyed to processor 40 by means of digital signals conveyed in a conventional manner on bus 41. After a short delay at step 72 (so called billing delay, required by the telephone companies) inquiry is made at step 73 whether the calling party is in fact another communications management system board. This is accomplished by listening for a pair of multi frequency "touch-tone" DTMF tones which would be transmitted by another board.

In the event that specific DTMF identified tones are transmitted on the incoming line, system 20 responds at step 74 by connecting the incoming line through cross point switch 32 to either internal modem 53, which converts transmitted digital data directly to serial digital data on bus 41, or to CODEC converters 48a and 48b, which convert transmitted voice data to digital data. The data is conveyed by bus 41 under the control of processor 40 to appropriate locations either in RAM 43 or in a storage medium of host computer 10 through computer interface 45. Upon completion of the data exchange, which may take place in either direction through modem 53, the transmission is terminated and the associated line interface circuit is conditioned to a disconnect or hang-up condition by line control circuit 39 in accordance with control signals developed on bus 41 by processor 40 during step 75.

In the event that the calling party is not another system, voice greetings are transmitted at step 76. At this time the management system makes inquiry as to the ID code of the caller, which may consist of a multi-digit code number transmitted by the caller using conventional DTMF touch-tone signals. For example, in the particular embodiment illustrated, the code may be preceded by a pound (#) symbol where the user desires and is authorized for data base access, and may be merely followed by such symbol where no data base access is desired or authorized. The voice message transmitted at step 76 may be stored in memory in digital form, and conveyed through CODEC 48a to the active line through cross point switch 32 under the control of processor 40.

The ID code transmitted by the caller is compared with previously stored valid codes in step 77 to determine the authority of such caller for access to information. A record of such codes may be maintained in storage either in the host computer 10 and accessed through interface 45, or may be contained within RAM 43, depending on system capacity. If the ID code is not valid and no system access is permitted, the caller is given the opportunity to store a message in step 78 and the call is terminated at step 79 by the appropriate line interface circuit under the direction of processor 40.

Once access has been granted at step 77, communications management system 20 issues an individualized greeting at step 80 by vocalization of digitally stored statements, as previously described. Following such greeting at step 80 inquiry is made at step 81 as to whether the caller requires access to the stored data base, which may be contained on disc or other storage medium in host computer. This request is indicated by the presence of a # symbol preceding the caller's access code. Assuming such request, and assuming the previously transmitted ID code number is valid for data base access, the caller is led through the data base in accordance with a subroutine at step 82. This subroutine may cause a number of vocalized (or voice) menus to be presented to the user to provide for efficient localization of desired data. Having completed inquiry of the data base, the caller is queried at step 83 whether he desires to leave a message. In the affirmative, step 85 is entered, and in the negative a hang-up routine at step 84 is initiated.

Assuming no further data base access, the system checks whether or not the owner has requested that calls from this particular caller be forwarded to another number. If so, communications management system 20 initiates a call forwarding subroutine at step 86 using the other telephone line. If no call forwarding is desired, an inquiry is made by the system at step 87 as to whether messages exist for this caller. This is accomplished by searching a digitally stored listing of message addressees in either host computer 10 or RAM 43 for the particular caller, as previously identified by ID code at step 77. If a message is waiting, such message is transmitted from its digital location, in either host computer 10 or RAM 43, to the caller in step 88. Following such message, the caller is queried at step 89 whether he or she desires to record a reply. In the affirmative, a record subroutine is entered into at step 90 by which a message is stored digitally by the caller. Finally, the caller is queried at step 93 whether he wants to leave any messages. If so, the messages are recorded for specific recipients in a subroutine at step 94 and upon completion the associated line interface circuit is conditioned to hang-up status at step 95. In the event no messages are to be left, a similar hang-up condition is obtained at step 96.

In each case where an inquiry is made of a caller, digitally stored verbal questions are conveyed from either a storage medium in host computer 10, such as a disc, through computer interface 45 to bus 41, or from RAM 43 on system board 21 to bus 41. CODEC converter 48a then converts each such digitized message to an analog audio signal which is conveyed through cross point switch 32 to the appropriate line interface circuit. The timing and routing of such data occurs under the control of processor unit 40 which operates under control of a program stored in PROM 42 and RAM 43. In practice, a portion of the software program may be stored in an appropriate medium in host computer 10 and conveyed to RAM 43 periodically as required through computer interface 45.

Responses made by the caller, when in the form of DTMF touch-tone signals, are decoded by detector 59a and applied to call progress monitoring circuit 50. This circuit is periodically addressed by processor 40 through bus 41 to determine the status of the call that any particular instant and responses made by the caller to verbal inquiries. Call progress monitoring circuit 50 is conditioned by processor 40 to provide outgoing DTMF signals under certain circumstances, as when communicating with another computerized management system. In such cases DTMF generator 49b is conditioned by circuit 50 to provide the necessary DTMF tones through cross point switch 32 to the appropriate line through line interface circuits 31 and 33. The line interface circuits 31 and 33 are at all times under control of line management circuit 39, which receives instructions from processor 40 by way of data bus 41.

When voice communications are received from the caller for storage, such communications are connected by cross point switch 32 to CODEC 48b through AGC circuit 56. CODEC 48b digitizes such voice messages and conveys them serially along bus 41 to a storage location designated by processor 40. Typically, the data are buffered into temporary locations in RAM 43, and then periodically transferred to an appropriate location on a disc or other storage location in host computer 10 to which access is provided by computer interface 45.

Figure 6:
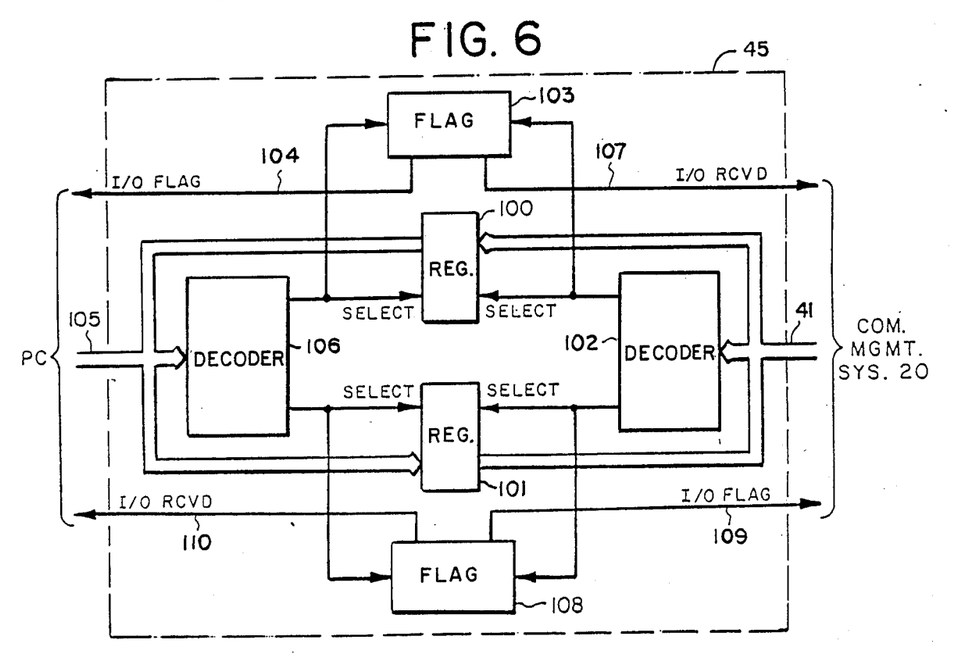
FIG. 6 is a simplified functional block diagram of the interface circuit utilized in the communications management system of the invention.

Referring to FIG. 6, the computer interface circuit 45 relied upon to convey digital data between the data and address buses (not shown) of the host computer 10 and the data in address buses 41 of communications management system 20 may be conventional in construction and operation. In particular, the interface circuit may include a first register 100 for buffering data read out from system 20 to computer 10, and a register 101 for buffering data read out from the computer to system 20. The occurrence of data to be read out to the computer is determined by a decoder 102 which provides a "select" output which enables register 100 upon the occurrence of an address on bus 41 corresponding to computer 10. This select signal causes register 100 to record the then existing data on the data bus 41 and further causes a flip-flop 103 to be set to indicate on I/O flag line 104 that indicates the presence of data for transmission to computer 10. Within computer 10 appropriate software is conditioned in response to the flag signal on line 104 to cause register 100 to be addressed on a bus 105. A decoder 106 recognizes this address and enables register 100 to read out the previously stored data, at the same time to be reset and thereby provide a signal to system 20 on the I/O received line 107.

Similarly, upon occurrence of data to be transmitted to management system 20 by computer 10 register 101 is addressed on bus 105. This causes decoder 106 to provide a select enabling signal to register 101, causing that device to store the then existing data on bus 105. At the same time, flip-flop 108 is conditioned to provide a flag signal on I/O line 109 of communications management system 20. This causes register 101 to be addressed on bus 41 under the direction of processor 40. Upon recognition of this address by decoder 102 an enabling signal is provided to register 101 to cause that device to read out the stored data on bus 41, and a reset signal is applied to flip-flop 108 to cause the I/O received signal to appear on a line 110 associated with computer 10.

Thus, under the operation of computer interface circuit 45 data is exchanged between of host computer 10 and the communication management system. Typically, computer interface 45 is electrically and mechanically compatible with an existing and conventional expansion slot of the computer so that board 21 can be conveniently mounted within the host computer housing.

To preclude unnecessary cycling on and off of the host computer during a normally busy period, such as during the normal work day, the system may include, in accordance with the invention, an internal timer which establishes one or more predetermined monitoring periods during which the computer is continuously powered. In the present embodiment this period is established by software operable in conjunction with clock/calendar 51a and a memory location 119 which sets a latch 120 in RAM 43 to provide timer access to the system.

User access to the system may be provided by a user-actuable push-button switch 121 on panel 23. Only following momentary actuation of this switch is a latch 122 within RAM 43 set (through interface 46 and CPU bus 41) and the keyboard rendered functional. Software access, as when a call is being received or sent, or when software is being transferred to or from the host computer, may result in setting of a latch 123. The setting of any one or more of latches 120, 122 and 123, which may comprise a designated portion 124 of RAM 43, as a consequence of requests for access by the three operating modes, causes relay 53 to be actuated and the host computer 10 to be powered.

In further accord with the invention, in powering down the computer latches 120, 122 and 123 are recognized by CPU 40 so that access by one mode is not interrupted by termination of a request for access by another mode. In particular, termination of a request for access by the user (by actuation of switch 121) will not power down the computer if either the timer or the software are requesting access. Furthermore, termination of a request by the timer (as with completion of the monitoring period) will not power down the computer if either user or software requests are present, and termination of a request for access by the software (as when no communications are occurring and all software is in place) will not result in power down if either the timer or the user have access.

Figure 7:
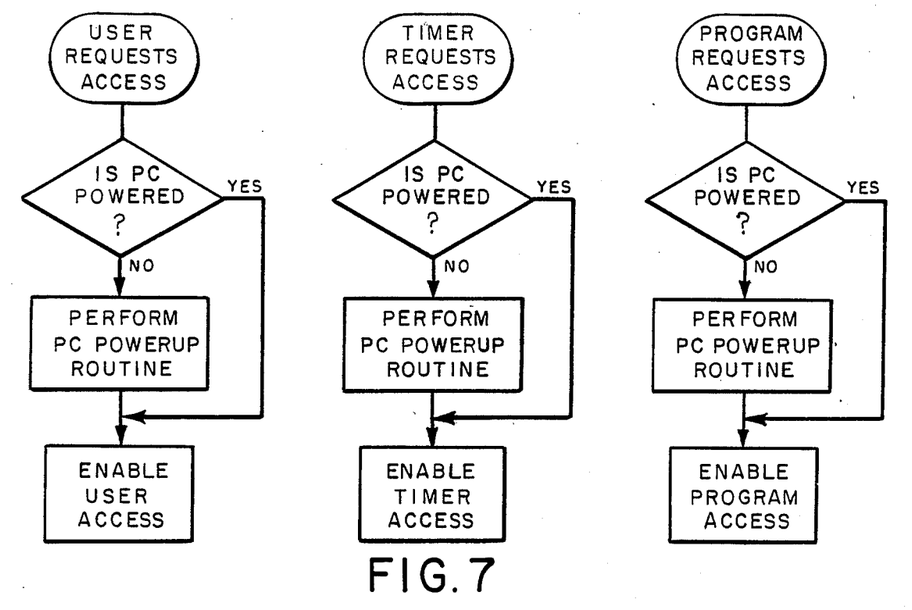
FIG. 7 is a simplified flow chart showing the principal decision processes involved in powering-up the computer.
Figure 8:
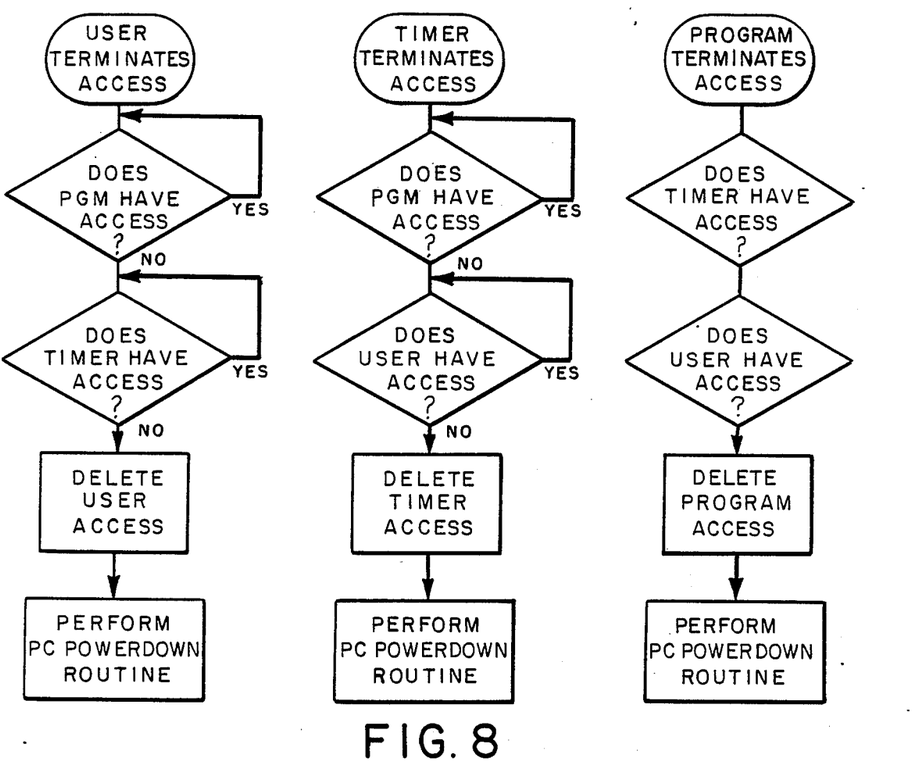
FIG. 8 is a simplified flow chart showing the principal decision processes involved in powering-down the computer.

This relationship is shown in FIG. 7, which illustrates power-up of the computer in response to user, timer and software requests for access, and FIG. 8, which illustrates protected power-down in response to access terminations by one or more of the requesters. By reason of power-down in response to termination by any one access requester being made dependent on the status of the other requester unintended interruption of the computer during an active procedure is avoided.

The above described power-up and power-down functions can be accomplished by CPU 40 using conventional and well known programming techniques.

Although it would be possible in theory to store all of the software required for operation of communications management system 20 on system board 21, a more efficient utilization of available memory capacity is obtained by storing a large portion of the software in an appropriate storage memory, such as on disc, in host computer 10. System software is typically loaded into the host computer from multiple discs and stored on a hard disc for future execution.

Typically, the resident RAM in the communication management system may have a capacity of approximately 256K. 32K is typically required for the resident processing software, leaving the balance of the RAM available for storage of messages for use during power up prior to access to the host computer. The disc drive of the host computer, which may have a capacity of 10 megabytes or greater typically, is utilized for storing the bulk of the management system software and for message files. Typically, such software and files are read as needed to the management system so that the host computer serves primarily as a storage device.

Upon loss of power to the system board 21 the contents of RAM 43 are lost. Consequently, upon initial power up of circuit board 21 it is necessary to convey to host computer 10 an interrupt signal so that the required software can be loaded from computer 10 into RAM memory 43. Such an interrupt signal can be provided by processor 40 under the direction of instructions in PROM 42.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A communications management system for use in conjunction with an externally-powered host computer for responding to communications signals on a communications line, comprising:

a power source independent of the host computer;

power control means responsive to applied control signals for applying operating power to the host computer;

first control circuit means responsive to the presence of a communications signal on said communications line and operable from said independent power source for applying a first control signal to said power control means to power-up the computer during a predetermined operating period;

second control circuit means including timer means defining a predetermined monitoring period for developing a second control signal for application to said power control means to control the application of power to the computer during said monitoring period; and mode control means responsive to said first and second control signals for automatically preventing said power control means from powering-down the computer in response to said first control signal during said predetermined monitoring period, and for preventing said power control means from powering-down the computer in response to said second control signal during said predetermined operating period.

2. A communications management system as defined in claim 1 including third control circuit means including a user-actuable switch for applying a third control signal to said power control means during a predetermined user access period to control the application of power to the computer; and wherein said mode control means is responsive to said first, second and third control signals for automatically preventing said power control means from powering-down the computer in response to said first control signal during either said predetermined monitoring period or said predetermined user access period, and for preventing said power control means from powering-down the computer in response to said second control signal during either said predetermined operating period or said predetermined user access period, and for preventing said power control means from powering-down the computer in response to said third control signal during either said predetermined operating period or said predetermined monitoring period.

3. A communications management system for use in conjunction with an externally-powered host computer for responding to communications signals on a communication line, comprising:

a power source independent of the host computer;

power control means responsive to applied control signals for applying operating power to the host computer, first control circuit means responsive to the presence of a communications signal on said communications line and operable from said independent power source for applying a first control signal to said power control means to power-up the computer during a predetermined processing period;

a timer defining a predetermined monitoring period for the host computer;

second control circuit means responsive to said timer for developing a second control signal for application to said power control means to control the application of power to the computer during said predetermined monitoring period;

a user-actuable switch for defining a predetermined user access period;

third control circuit means responsive to actuation of said switch for applying a third control signal to said power control means during said predetermined user access period to control the application of power to the computer; and mode control means responsive to said control signals for automatically preventing said power control means from powering-down the computer in response to said first control signal during either said predetermined monitoring period or said predetermined user access period, and for preventing said power control means from powering-down the computer in response to said second control signal during either said predetermined operating period or said predetermined user access period, and for preventing said power control means from powering-down the computer in response to said third control signal during either said predetermined operating period or said predetermined monitoring period.

* * * * *